Patented July 31, 1923.

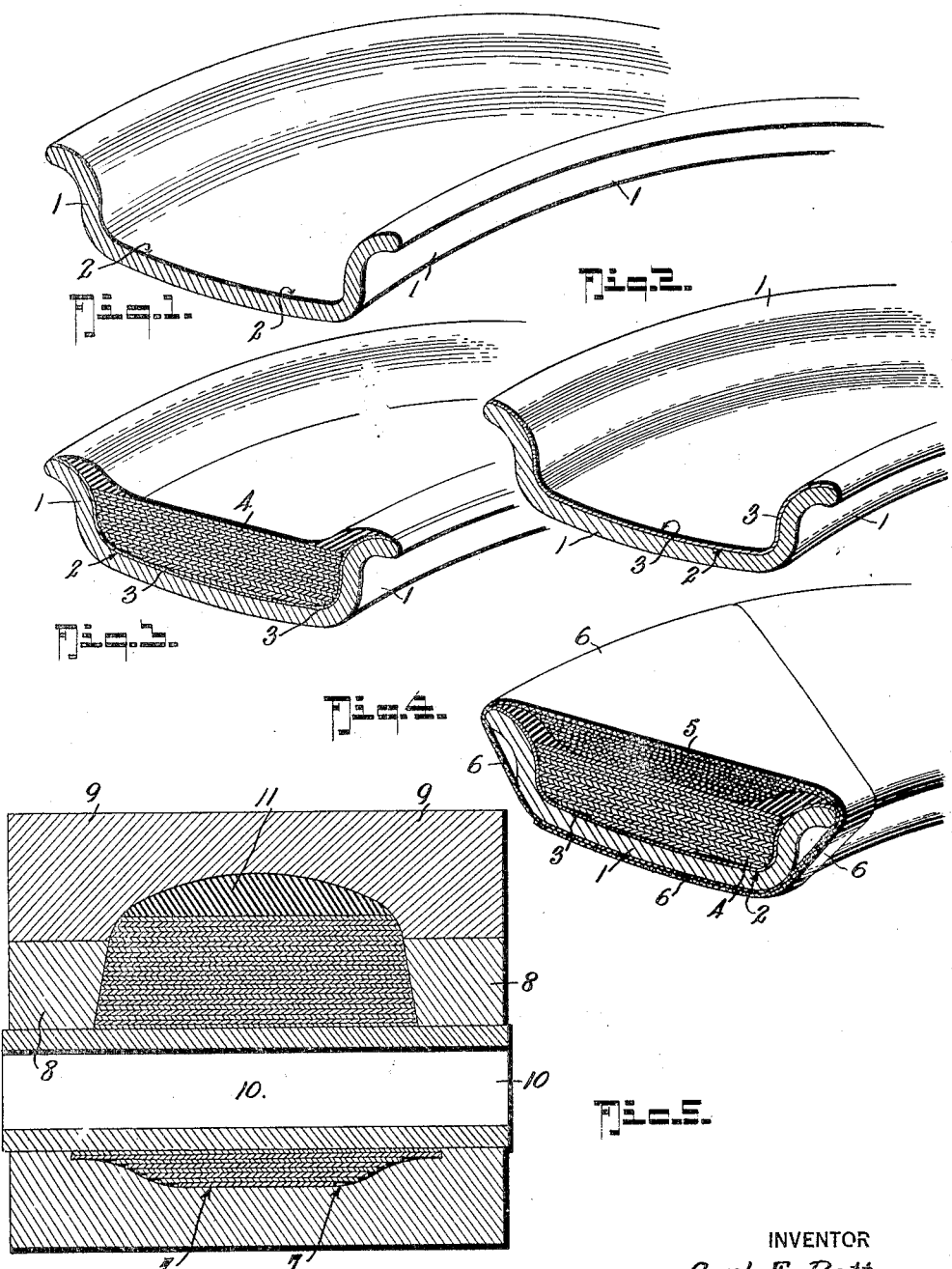

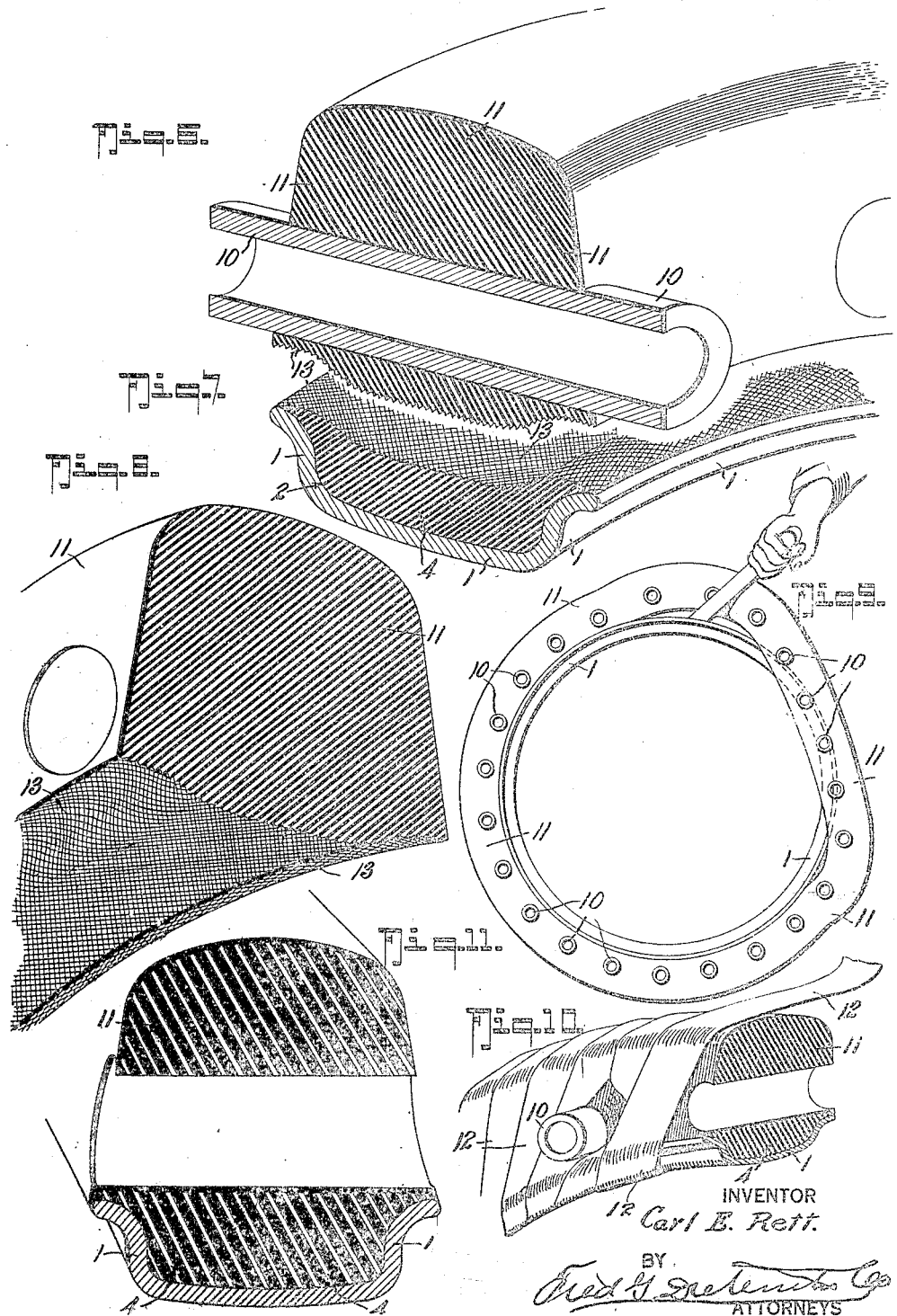

1,463,754

UNITED STATES PATENT OFFICE.

CARL E. RETT, OF AKRON, OHIO, ASSIGNOR TO LAMBERT TIRE & RUBBER CO., OF BARBERTON, OHIO, A CORPORATION OF ARIZONA.

METHOD OF MANUFACTURING TIRES.

Application filed September 2, 1922. Serial No. 587,141.

*To all whom it may concern:*

Be it known that I, CARL E. RETT, a citizen of the United States, residing at Akron, in the county of Summit and State of Ohio, have invented a certain new and Improved Method of Manufacturing Tires, of which the following is a specification.

This invention relates to the art of tire building and especially for that branch of the art which has to do with the manufacture of cushion tires and more particularly vented cushion tires. Heretofore in the manufacture of tires of the type to which the present invention particularly relates each different style of rim required a different mold to be used in forming and vulcanizing the tire as the mold had to fit the rim and different shaped rims made different molds necessary. This required a large stock of molds to be provided by the tire builder; wherefore the present invention has for an object to provide a method of building tires by means of which only one mold need be used in which the tire carcass may be built regardless of the rim on which it is to be placed, thus saving a large investment in molds as well as standardizing the tire regardless of the rim on which it is to be placed.

Generically, in carrying out the invention, any rim that is to be supplied with a cushion tire is provided with a tire base that is built up on the rim in such manner that the periphery of the tire base approximates the standard cross sectional shape and size of that portion of the tire body which is to be attached to the base; the body of the tire is separately built up to a standard size and the base portion in the rim and the tire body are separately partly cured or vulcanized, after which the body portion of the tire is stretched over the base portion on the rim; the carcass is then wrapped and the base and body portions vulcanized together into a unitary mass.

More specifically the invention includes those novel steps and operations in tire building which will hereinafter be described, then be specifically pointed out in the appended claims, reference being had to the accompanying drawings, in which:

Figure 1 is a sectional perspective view of a rim on which a cushion tire is to be built up.

Figure 2 is a cross section of the rim showing the cement coat applied.

Figure 3 is a cross section of the rim after the base material is built up to the required depth and dimensions.

Figure 4 is a view similar to Figure 3 showing the rim and base material wrapped ready for partial vulcanization.

Figure 5 is cross section of a mold and tire body built up in the same ready for partial vulcanization.

Figure 6 is a sectional perspective view of the tire body after partial vulcanization and removal from the mold.

Figure 7 is a detail sectional perspective view of the rim and base portion of the tire after the same has been partially cured and the peripheral surface of the base portion has been roughened.

Figure 8 is a detail perspective view of the under side of the body portion of the tire showing how it has been roughened prior to being placed on the base portion.

Figure 9 is a detail side elevation on a small scale showing how the body portion is stretched and placed over the base portion of the tire.

Figure 10 is a sectional perspective view of a portion of the rim base section and body section of the tire wrapped ready for final vulcanization.

Figure 11 is a detail sectional perspective view of a portion of the complete tire after removal of the wrapping and extraction of the core pipes.

In the drawings in which like numerals of reference indicate like parts in all of the figures, 1 represents the rim, the cross sectional form of which may be of any of the standard types. In building up tires by this process, it is only necessary to provide one body mold in which the body portion of the tire is built up (i. e. one mold for each size of tire).

In carrying out the invention, the rim 1 has its surface 2 brass plated and then covered with a layer of rubber cement 3. The tire builder then builds up in the rim a base structure 4 sufficient to fill the rim to the desired extent and provide the required peripheral surface of the cross sectional form and dimensions to receive the standard body portion of the tire. The rim and its built up tire base portion 4 are then wrapped at 5 and 6 in the usual way with canvas and placed in a vulcanizing chamber and partially cured, after which the wrapping is removed and the rim with the tire base is ready to receive the partially cured body portion of the tire.

The body portion of the tire is built up in a mold 8 having a base configuration of standardized form at 7, in the usual way. These molds 8 may be of the kind disclosed in Letters Patent No. 1,386,513 issued to Henry M. Lambert August 2, 1921, or Letters Patent No. 1,399,128 issued to Henry M. Lambert December 6, 1921, or Letters Patent No. 1,386,512 issued to Henry M. Lambert August 2, 1921, or any other suitable type of mold, as the mold per se forms no part of the present invention. The molds referred to consist generally of side plates 8—8 and a sectional periphery plate or ring 9 with core pins 10 to form the holes in the tire.

After the tire body 11 is built up in the mold 8—8 in any approved way, the mold and contents are placed in a vulcanizing kettle and the contents partially cured, after which the mold plates are removed leaving the core pins in the body portion of the tire.

The surface of the base portion and body portion of the tire which are designed to fit together, are preferably roughened, as at 13, and painted with a rubber cement, after which the body portion is stretched over the base portion and the parts assembled as shown in Figure 9.

The entire structure is then wrapped in canvas, as at 12, and vulcanized according to the usual wrapping process, following which the wrapping is removed and the core pins 10 are pressed out leaving the tire in the completed state shown in Figure 11.

By making the configuration of the surface 7 of the mold of a standard dimension and cross sectional form for each size of tires, only one set of molds for each size of tire is required. For instance if the tire maker is building four inch tires, he will have one mold for a four inch size and, by this process, he would take any of the standard rims which four inch tires are supposed to fit and by building up the base structure in the manner described, he can adapt any rim to take the standard body portion of the tire, thus making it unnecessary to have a special mold for each different design of rim or size of tire.

From the foregoing description, taken in connection with the accompanying drawings, it is thought the method will be clear to those skilled in the art to which it appertains.

What I claim is:

1. The method of tire building which consists in taking a rim of any usual cross sectional shape, building up a tire base in the rim and partially curing the same; building up a tire body separately from the rim base and partially curing the same; subsequently stretching the tire body and placing it over the base portion on the rim; then vulcanizing the whole together.

2. In a method of tire building the steps which comprise taking a rim and covering its periphery with rubber cement and building up on the rim a tire base structure and partially curing the same.

3. In a method of tire building, the steps which comprise building up a tire body portion without a base or rim engaging portion and partially curing the same.

4. The method of tire building which consists in taking a rim having a surface possessing an affinity for rubber, covering the surface with rubber cement and building in the rim a tire base structure, then partially curing the same; taking a mold and building up a tire body portion in the mold and partially curing the same; removing the body portion from the mold and stretching it over the base portion in the rim and finally vulcanizing the mass in a unitary structure.

5. The method of tire building which consists in taking a rim of any usual cross sectional form and building up a base structure in the rim, the peripheral surface of which is of a definite and predetermined dimension, wrapping the same and partially curing it, then unwrapping the partially cured mass; building up a body portion separate from the base in a mold having core pins, partially vulcanizing the body portion while in the mold, then removing the mold while leaving the core pins in the body portion, stretching the body portion and placing it over the base portion and vulcanizing the body and base portions together in a unitary structure and then removing the core pins.

6. The method of tire building which consists in building up a body portion having an inner annular surface of predetermined size and cross sectional form and partially vulcanizing the same; building up a base portion in a tire rim, making the periphery of said base portion accord with the inner annular surface of the body portion, partially vulcanizing the base portion and then stretching the body portion over and fitting it onto the base portion and subsequently vulcanizing the mass to unite the base and body portions and complete the act of vulcanization.

CARL E. RETT.